United States Patent [19]

Sugino et al.

[11] Patent Number: 4,538,569

[45] Date of Patent: Sep. 3, 1985

[54] COMPRESSION CONTROL SYSTEM FOR AN INTERNAL COMBUSTION ENGINE AND CONTROL METHOD THEREFOR

[75] Inventors: Shigemi Sugino, Fujisawa; Kenichi Sasaki, Yokohama; Yoshio Iwasa, Nagareyama, all of Japan

[73] Assignee: Nissan Motor Company, Limited, Yokohama, Japan

[21] Appl. No.: 465,495

[22] Filed: Feb. 10, 1983

[30] Foreign Application Priority Data

Mar. 1, 1982 [JP] Japan ................................. 57-32071

[51] Int. Cl.³ ............................................. F01L 13/08
[52] U.S. Cl. .................................. 123/316; 123/90.11
[58] Field of Search ..................... 123/90.11, 182, 308, 123/316, 432

[56] References Cited

U.S. PATENT DOCUMENTS

| | | | |
|---|---|---|---|
| 3,919,986 | 11/1975 | Goto | 123/316 |
| 3,935,846 | 2/1976 | Zelenka | 123/90.11 |
| 4,103,648 | 8/1978 | Jarry | 123/316 |
| 4,442,809 | 4/1984 | Nohira et al. | 123/316 |

FOREIGN PATENT DOCUMENTS

| | | | |
|---|---|---|---|
| 1085379 | 7/1960 | Fed. Rep. of Germany | 123/182 |
| 2061622 | 7/1972 | Fed. Rep. of Germany | 123/316 |
| 3019109 | 11/1981 | Fed. Rep. of Germany | 123/90.11 |
| 54-135921 | 10/1979 | Japan | 123/316 |
| 56-46163 | 4/1981 | Japan | |

*Primary Examiner*—Parshotam S. Lall
*Assistant Examiner*—W. R. Wolfe
*Attorney, Agent, or Firm*—Schwartz, Jeffery, Schwaab, Mack, Blumenthal & Evans

[57] ABSTRACT

A compression control system for an internal combustion engine for preventing the engine from knocking and for improving starting characteristics including an air/fuel mixture feedback circuit for feeding some of an air/fuel mixture in an engine combustion chamber back to the intake duct at a controlled rate. The feedback rate of the air/fuel mixture is determined on the basis of the engine operational condition and is controlled by a compression control valve inserted in the feedback circuit. The compression control valve is associated with a controller which detects the engine operating condition and determines the open period of the compression control valve in accordance with the engine operating condition. The controller also detects the engine operational position in the engine revolution cycle to synchronize the operation of the compression control valve with the engine revolution so that the compression control valve is opened for the controlled duration during the compression stroke of the engine.

21 Claims, 9 Drawing Figures

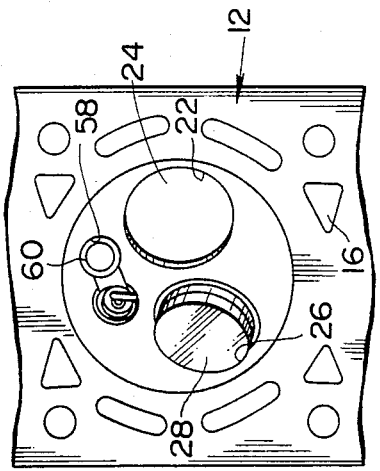
FIG.2
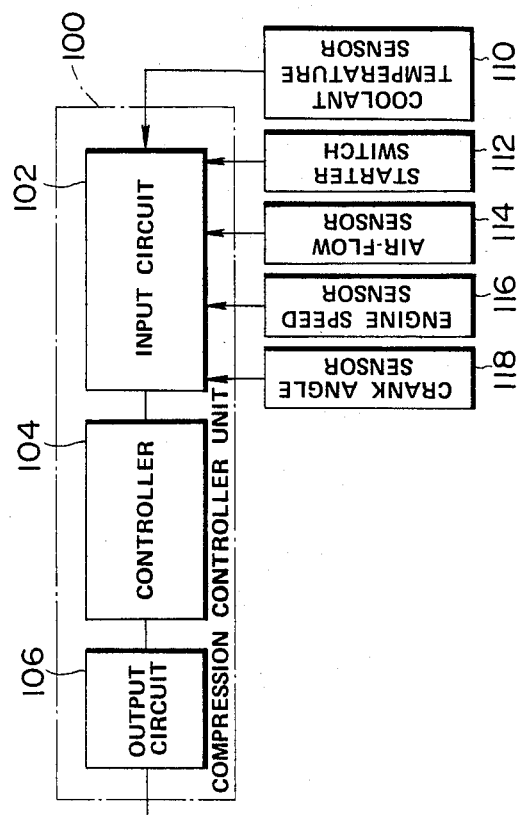
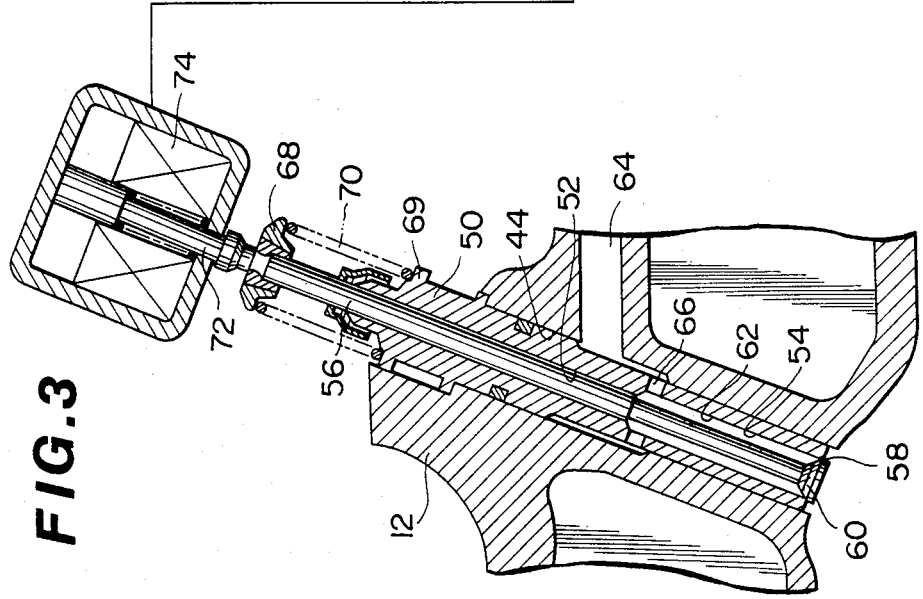
FIG.3

COMPRESSION CONTROL SYSTEM FOR AN INTERNAL COMBUSTION ENGINE AND CONTROL METHOD THEREFOR

BACKGROUND OF THE INVENTION

The present invention relates generally to a compression control system for an internal combustion engine and control method therefor for controlling charge pressure in an engine combustion chamber. More specifically, the invention relates to a knock-free engine compression control system for avoiding possible engine knocking by controlling the charge pressure in the combustion chambers of a reciprocating internal combustion engine.

One way to obtain better performance in an internal combustion engine and to achieve better fuel economy is to increase the compression of the air/fuel mixture in the combustion engine. Recently, the compression ratio in the engine combustion chambers has tended to be increased for the sake of better engine performance and fuel economy. Such high-compression-type engines experience problematic engine knocking, since increasing the compression in the combustion chambers causes a higher probability of occurrence of engine knocking. In particular, at relatively high engine loads or at substantially high engine temperatures engine knocking at harmful intensity levels may occur. On the other hand, if the engine compression ratio is lowered, the output torque of the engine, and thus the engine output performance, is also decreased. This accordingly degrades fuel economy.

In order to prevent the engine from knocking at harmful intensities at relatively high compression ratios, the spark advance angle can be controlled to retard the spark advance angle in response to the engine knocking. This tends to drive the spark ignition timing in the engine away from the best torque timing, thereby degrading engine output performance. Furthermore, retardation of the spark advance angle may cause an increase in the exhaust gas temperature so that a catalytic converter in the exhaust system may be damaged by the heat of the exhaust gas.

In another approach, the compression ratio in the combustion chamber can be controlled to eliminate engine knocking. This has been attempted by controlling the operational timing of an intake valve, which control has been disclosed, for example, in Japanese Utility Model Publication (Jikko) Sho 52-1953. The compression ratio control has also been attempted by means of a dual compression piston as set forth in Japanese Patent First Publication (Tokkai) Sho 56-46163.

Although various attempts have been made for knock-free compression control in the internal combustion engine, none of the conventional art can successfully and satisfactorily control the compression ratio in accordance with the engine operating conditions.

The present invention is, therefore, intended to provide a engine compression control system and method which satisfactorily and successfully prevent the engine from knocking harmfully without causing a decrease in the engine output performance, therey maintaining fuel economy at a reasonable level. According to the present invention, compression control can be performed by feeding back the introduced air/fuel mixture to an induction system downstream of a throttle valve at a controlled rate which is determined in accordance with the engine operating conditions.

SUMMARY OF THE INVENTION

As set forth previously, it is an object of the present invention to provide a compression control system for an internal combustion engine which controls the amount of the air/fuel mixture in the engine combustion chamber by feeding back some of the mixture to an engine induction system.

Another object of the present invention is to provide a compression control system which detects the engine operating conditions to determine the amount of the air/fuel mixture to be fed back to the induction system.

A further object of the invention is to provide a compression control valve, the ratio of the opening period and closing period of which is controlled by the control system in order to adjust the compression in the engine in accordance with the engine operating conditions.

Yet another object of the present invention is to provide a method for controlling the engine compression pressure in accordance with the engine operating conditions and depending on the probability of causing harmful engine knocking.

In order to achieve the foregoing and other objects, there is provided, according to the present invention, a compression control system for an internal combustion engine, which includes a mixture feed-back system having a compression control valve. The compression control valve is operated by an electromagnetically operated actuator which is controlled by a controller unit associated with various sensors detecting various engine operational parameters. Based on the engine operating conditions determined on the basis of the detected engine operational parameters, the controller unit derives a control signal for controlling the operation of the compression control valve and outputs the control signal at a given timing. The control signal is distributed to each of the compression control valves associated with each of the engine cylinder.

In the preferred embodiment, the feed-back ratio of the air/fuel mixture is determined in conjunction with the engine speed, the engine load, the engine temperature and the starter switch position. The feed-back ratio of the air/fuel mixture is represented by the duty cycle of the control signal defining the duty cycle of the compression control valve. In addition, the control signal may be distributed to each compression control valve when the associated engine cylinder approaches bottom dead center in its induction stroke.

According to one aspect of the present invention, the compression control system comprises an engine cylinder defining a combustion chamber therein, an induction system for introducing an air/fuel mixture into the combustion chamber, a return passage defined in the engine cylinder and connecting the combustion chamber to the induction system in order to feed back some of the air/fuel mixture in the combustion chamber to the induction system, a compression control valve provided in the return passage and movable between a first position in which the communication between the combustion chamber and the induction passage via the return passage is blocked and a second position in which that communication is established, a controller for controlling the operation of the compression control valve depending on the engine operating conditions, the controller producing a control signal to actuate the compression control valve from the first position to the second position for a period determined in accordance with the engine operating conditions at a predetermined timing.

According to another aspect of the present invention, a method for controlling engine compression comprises the steps of defining a feedback circuit for feeding back part of the air/fuel mixture in the combustion chamber to an induction system of the engine, providing a compression control valve in the feedback circuit, detecting engine operating conditions, determining the opening period of the compression control valve in accordance with the engine operating conditions, detecting the engine operational position in terms of engine rotation, and determining the time at which to open the compression control valve based on the detected engine operational position so that the compression control valve is operated in synchronism with the engine rotation.

BRIEF DESCRIPTION OF THE DRAWINGS

The present invention will be understood more fully from the detailed description given herebelow and from the accompanying drawings of the preferred embodiment, which, however, should not be understood as limitative to the present invention but for elucidation and explanation only.

In the drawings:

FIG. 2 is a cross-sectional view taken along line II—II of FIG. 1;

FIG. 3 is an enlarged sectional view of the preferred embodiment of a compression control valve and a diagram of the associated compression controller unit;

DESCRIPTION OF THE PREFERRED EMBODIMENTS

Figure 1:
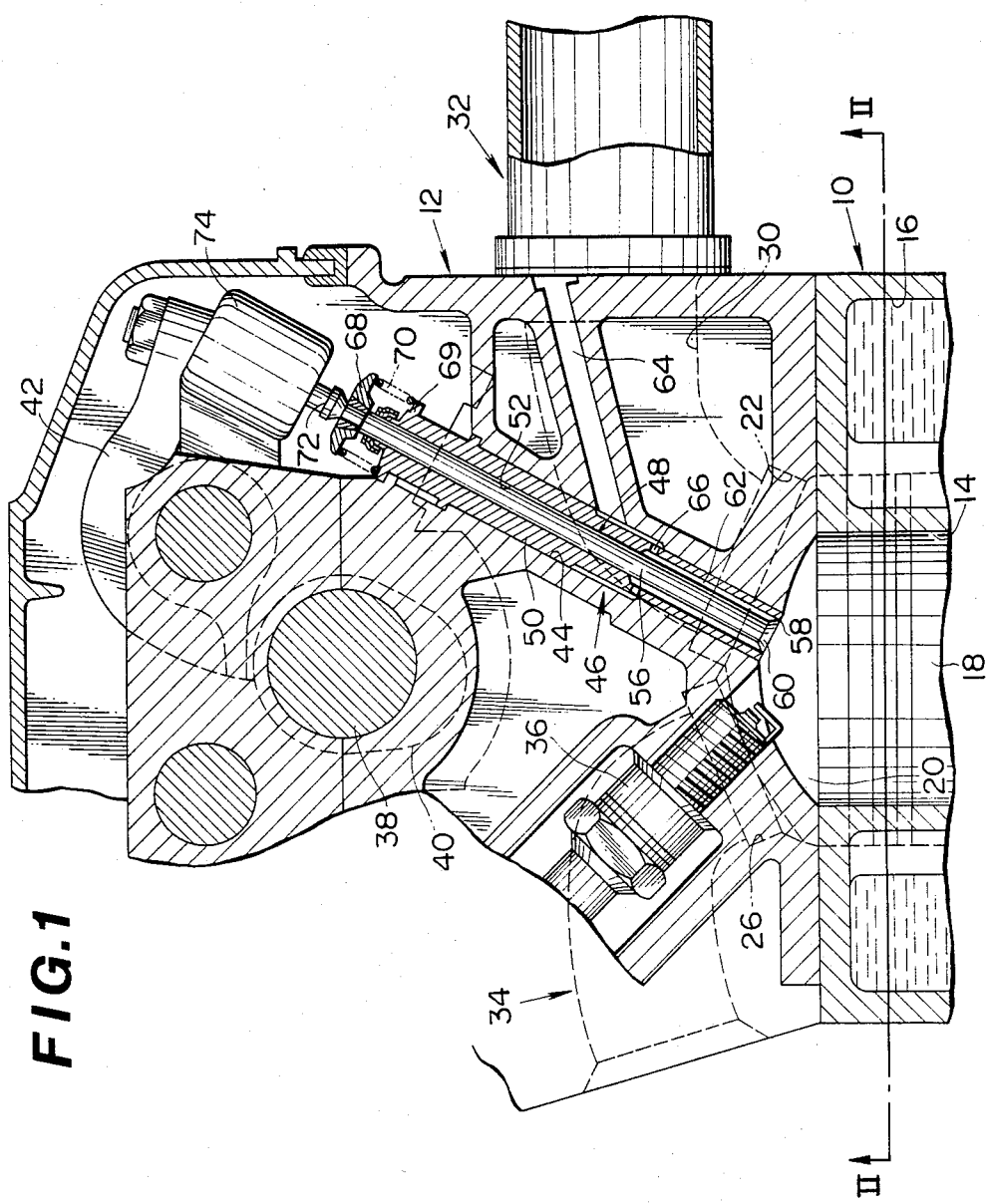
FIG. 1 is a cross-sectional view of major part of an internal combustion engine incorporating the preferred embodiment of a compression control system according to the present invention.

Referring now to the drawings, particularly to FIG. 1, there is illustrated the preferred embodiment of a compression control system as applied to a reciprocating overhead-camshaft internal combustion engine. The engine generally comprises a cylinder block 10 and a cylinder head 12. The cylinder block 10 is formed with a cylinder bore 14 and a water jacket 16 through which an engine coolant recirculates to cool the engine cylinder block. A reciprocating piston 18 is reciprocally inserted into the cylinder bore 14 to define a combustion chamber 20 between the top thereof and the cylinder head 12. The cylinder head 12 is formed with an induction port 22 sealable by an intake valve 24 and an exhaust port 26 sealable by an exhaust valve 28. (Intake valve 24 and exhaust valve 28 are visible in FIG. 2.) The induction port 22 communicates with an intake manifold 30 of an induction system 32. The exhaust port 26 communicates with an exhaust system 34. A spark ignition plug 36 is exposed to the combustion chamber 20 in order to perform spark ignition in the combustion chamber.

A camshaft 38 with cams 40 is rotatably housed in the cylinder head 12 for rotation in synchronism with the engine. The cams 40 are secured to the camshaft 38 for rotation therewith. The cams 40 are respectively associated with rocker arms 42 which actuate the intake and exhaust valves 24 and 28 at given timings in synchronism with engine rotation.

The cylinder head 12 is formed with an opening 44 which extends to the combustion chamber 20. A compression control valve 46 comprises a valve member 48 and a valve guide 50. The valve guide 50 has an axially-extending valve hole 52 with a larger-diameter section 54 (See FIG. 3). A valve stem 56 extends through the valve hole 52 and is slidable therethrough. The valve guide 50 defines a valve seat 58 at the inner end of the valve hole 52 to receive a valve head 60, formed at the corresponding end of the valve stem 56.

The valve stem 56 defines an annular passage 62 in conjunction with the surface of the larger diameter section 54. The annular passage 62 communicates with the intake manifold 32 via a return passage 64 formed through the cylinder head 12 and an aperture 66 formed in the valve guide 50. At the top of the valve stem 56, a spring seat 68 is secured. The spring seat 68 opposes a top flange 69 extending laterally from the end of the valve guide 50 distal from the combustion chamber. The top flange 69 serves as a spring seat for retaining a bias spring 70 in conjunction with the spring seat 66. The end of the valve stem 56 opposes a valve actuator rod 72 associated with an electromagnetically operated valve actuator 74 secured to the cylinder head 12.

The valve member 46 is normally biased in the direction to seat the valve head 60 onto the valve seat 58 to block communication between the combustion chamber 20 and the annular passage 62. The valve actuator 74 when energized pushes the top of the valve stem 56 via the valve actuator rod 72. The duty cycle of the valve actuator 74 is controlled by a control signal fed from a compression controller unit 100.

As shown in FIG. 3, the compression controller unit 100 comprises an input circuit 102, a controller 104 and an output circuit 106. The input circuit 102 is connected to an engine coolant temperature sensor 110, a starter switch 112, an air-flow sensor 114, an engine speed sensor 116 and a crank angle sensor 118. The engine coolant temperature sensor 110 is inserted into the water jacket 16 to detect the engine coolant temperature to produce a temperature signal $S_t$ having a value proportional to the detected engine coolant temprature. The starter switch 112 is turned on while the engine is cranking and feeds a HIGH-level starter signal $S_c$ during that time. The air-flow sensor 114 is inserted into the induction system 32 to produce a load signal $S_Q$ having a value representative of the air flow rate through the induction system and thus indicative of the load on the engine. The engine speed sensor 116 is adapted to detect the revolution speed of the engine to produce an engine speed signal $S_N$ having a valve proportional to the engine revolution speed. The crank angle sensor 118 detects a crank reference angular position and crankshaft rotation per a given angle. The crank angle sensor 118 produces a crank reference signal $S_{ref}$ at every crankshaft reference angular position and a crank position signal $S_{pos}$ per given angle of crankshaft rotation.

Figure 5:
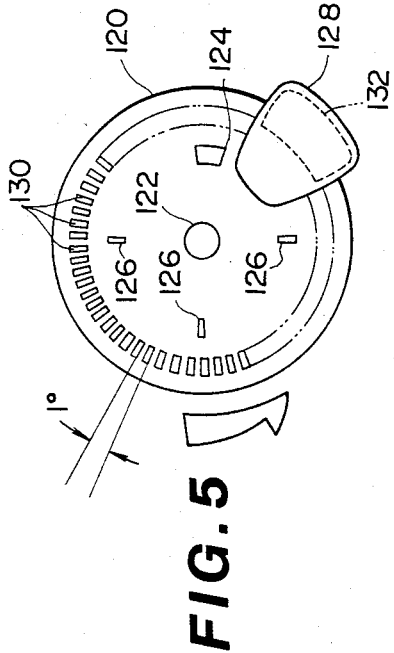
FIG. 5 is a fragmental illustration of a crank angle sensor employed in the preferred embodiment of the compression control system.

Preferably, the crank angle sensor 118 is constructed as illustrated in FIG. 5 to have a rotational disc 120 secured to a crankshaft 122. The rotational disc 120 is formed with a plurality of slits 124 and 126 at positions corresponding to the crankshaft reference angle positions. As will seen herefrom, the slit 124 corresponding to the top dead center of a specific cylinder such as No. 1 cylinder, has a unique angular width so that the signal duration of the crank reference signal $S_{ref}$ identifies that specific cylinder. Opposite the rotational disc 120, a photo-sensitive sensor member 128 is provided to produce the crank reference signal $S_{ref}$ each time one of the slits 124 or 126 passes. The rotational disc 120 is further formed with a plurality of slits 130 at a regular interval corresponding to the given rotational angle of the crankshaft, e.g., per 1° of rotational angle. Opposite the alignment of slits 130, a photo-sensitive member 132 is provided to produce the crank position signal $S_{ref}$ for each given angle of rotation of the crankshaft.

Returning to FIG. 3, the controller 104 receives the input signals via the input circuit 102. Based on the engine operational parameters represented by the input signals, the controller 104 recognizes the engine operating condition to determine the duration of the control signal. When the starter switch 112 is turned ON and therefore the engine is detected to be cranking, the duration of the control signal which defines the energized period of the valve actuator 74 is fixed to be a predetermined constant value. After cranking and thus with the engine is running, the duration of the control signal is generally determined as a function of the engine speed and the engine load. If the engine coolant temperature exceeds a given temperature threshold, the duration of the control signal is corrected by a correction value determined in accordance with the engin coolant temperature.

Figure 7:
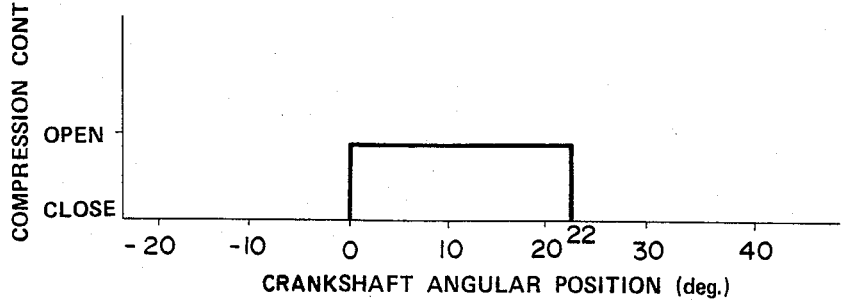
FIG. 7 is an illustration of the timing of operation of the compression control valve as controlled by the controller of FIG. 4.

The controller 104 also controls the distribution of the control signal to each of the engine cylinders on the basis of the crankshaft angular position. In practice, the controller 104 outputs the control signal via the output circuit 106 at the bottom dead center of the intake stroke of each piston to open the compression control valve at the beginning of the compression stroke for an engine rotation angle defined by the duration of the control signal, as shown in FIG. 7.

The controller 104 and the function thereof will be described in greater detail below with reference to FIG. 4. The controller 104 comprises a discriminator circuit 140, a memory 142, an arithmetic circuit 144, a register 146 and a counter 148. The discriminator 140 is adapted to receive a coolant temperature-indicative signal from the input circuit 102 to compare the same to a given reference value which is representative of the given temperature threshold. The discriminator 140 produces a discriminator signal when the coolant temperature signal value is equal to or more than the reference value, which discriminator signal has a value proportional to the coolant temperature signal value. The discriminator 140 is also responsive to the HIGH level starter signal indicative of the starter switch ON position and thereby indicative of the engine cranking condition to output a HIGH-level discriminator signal.

The memory circuit 142 stores the values defining the duration of the control signal in the form of look-up tables. The table address $T_1$ holds a constant value to be read out in response to a discriminator signal indicative of the starter switch ON position. The table address $T_2$ holds a value $t_2$ to be read out under engine operating conditions wherein the engine speed is relatively low, the engine load is relatively low and the engine coolant temperature is higher than the given temperature threshold. The table address $T_3$ holds a value $t_3$ to be read out under engine operating conditions wherein the engine speed is higher than a given speed threshold and the engine load is higher than a given load threshold and the engine coolant temperature is below the given temperature threshold. The table address $T_4$ holds a value $t_4$ to be read out under engine operating conditions wherein the engine speed is higher than the given speed threshold, the engine load is higher than the load threshold and the engine coolant temperature is higher than the temperature threshold. The arithmetic circuit 144 receives the engine speed signal, the engine load signal from the input circuit 102 and discrimnator signals indicative of the engine coolant temperature condition and the starter switch position. In accordance with the input parameters, the arithmetic circuit 144 produces an access signal to access one of the table addresses $T_1$ to $T_4$ to determine the duration of the control signal. The arithmetic circuit 144 feeds the desired value to the register 146. The register 146 temporarily stores the read-out value and is updated whenever the arithmetic circuit 144 reads out another stored value from the memory 142.

The counter 148 is a kind of gate circuit which selectably allows and blocks transmission of the control signal to respective valve actuator 74 via the output circuit 106. The counter 148 receives the crank reference signal and the crank position signal to distinguish the engine cylinder to output the control signal and to determine the timing at which to terminate the control signal. In practice, the counter 148 determines which engine cylinder is currently at the bottom dead center of its intake stroke on the basis of the crank reference signal $S_{ref}$ to select one of a plurality of gates 148-1 to 148-4.

In the shown embodiment, the counter 148 has four gates for compression control in a four-cylinder engine, but the number of gates should be selected in accordance with the number of cylinders of the engine to which the compression control system is being applied.

The output circuit 106 has control signal generators 106-1 to 106-4 respectively connected to the gates 148-1 to 148-4 of the counter. The counter also includes a counting circuit which counts the crank position signals sequentially received thereby. The counting circuit is responsive to the crank reference signal to restart its counting operation and continuously produces a counter signal having a value indicative of the counter value thereof. The counter signal is fed to a comparator. The comparator is responsive to the crank reference signal to output a HIGH-level signal to the gates 148-1 to 148-4 and compares the counter signal value with the register value in the register 146. The comparator terminates the HIGH-level signal when the counter value reaches the register value. The HIGH-level signal of the comparator is fed to the one of the control signal generators 106-1 to 106-4 corresponding to the engine cylinder currently at the bottom dead center position of its intake stroke and corresponding to the one of the gates 148-1 to 148-4 selected. The control signal generators 106-1 to 106-4 are responsive to the HIGH-level signal of the comparator 148-6 inputted via the gates 148-1 to 148-4 to produce a control signal having a duration defined by the stored value in the memory 142.

The control signal is fed to the valve actuator 74 to energize the valve actuator for a period corresponding to the signal duration thereof. The valve actuator 74 when energized actuates the valve actuator rod 72 to push the valve stem 56 and displace the valve head 60 from the valve seat 58. As a result, the annular passage 62 communicates with the combustion chamber to feed some of the air/fuel mixture in the combustion chamber 20 back to the intake manifold 30.

Figure 4:
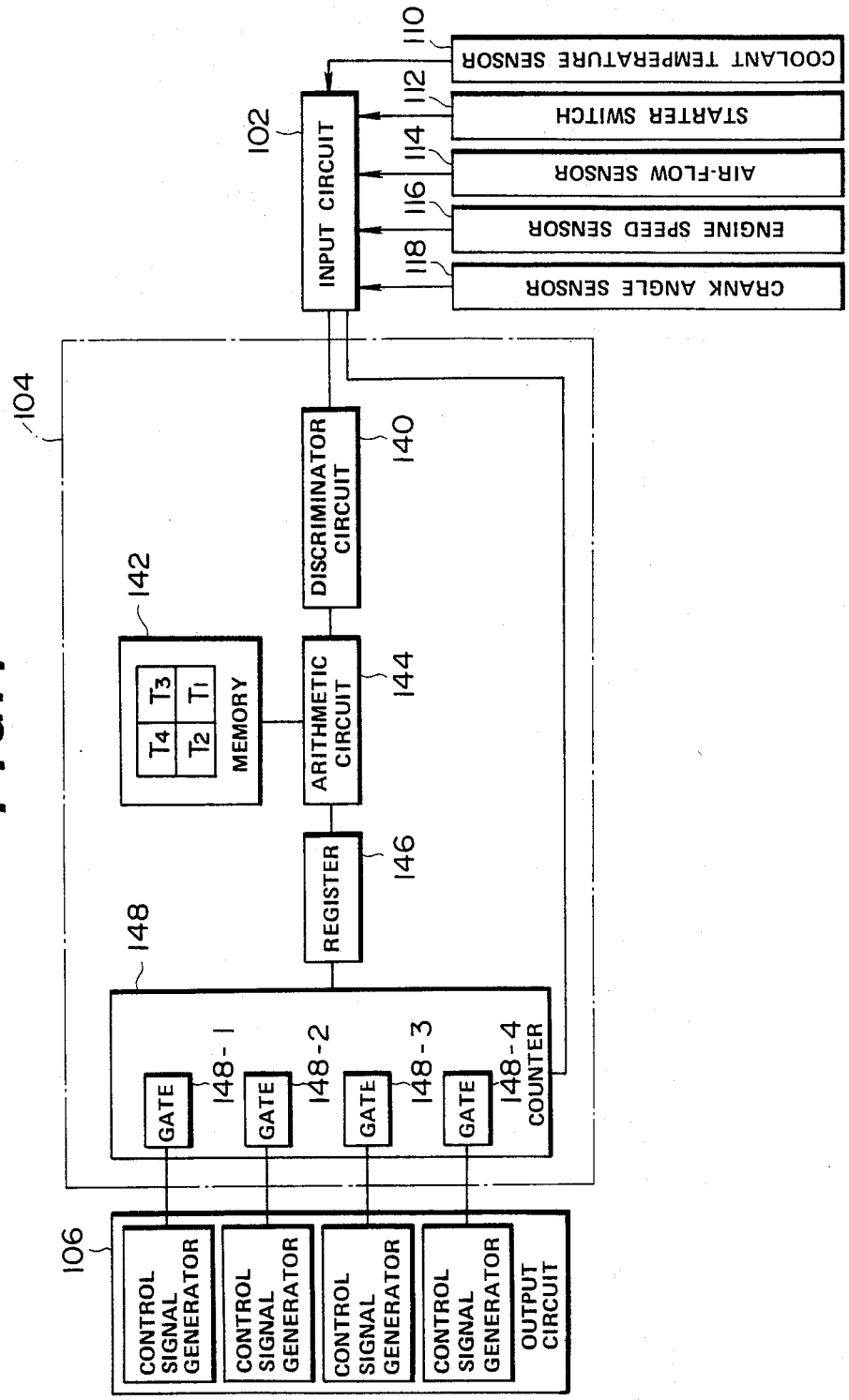
FIG. 4 is a schematic block diagram of a controller associated with various sensors.
Figure 6:
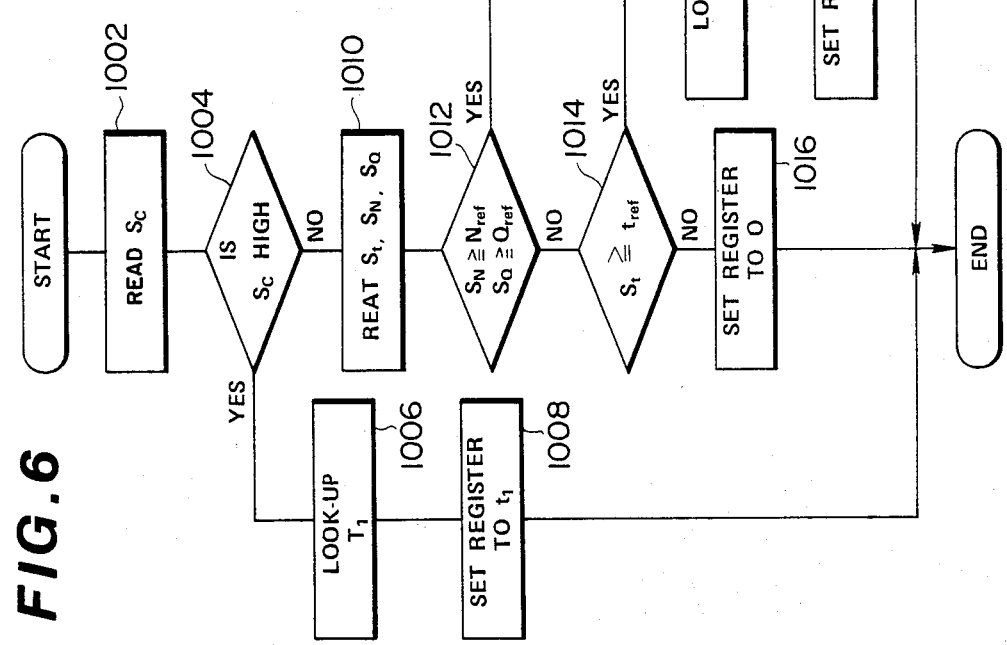
FIG. 6 is a flowchart of the operation of the controller of FIG. 4.

FIG. 6 is a flowchart of the operation of the arithmetic circuit 144 of FIG. 4. The operation of the arithmetic circuit 144 to determine the duration of the control signal and thereby to determine the control ratio of the compression in the combustion chamber will be described with reference to FIG. 6.

The arithmetic operation of the arithmetic circuit may be performed at regular intervals, for example, each cycle of engine revolution. First, the discriminator signal indicative of the starter switch position is read in, at a block 1002. Then at a block 1004, the discriminator signal is checked to determine whether the starter switch 112 is ON. If the starter switch is ON and therefore the answer of the block 1004 is YES, the table address $T_1$ is accessed by way of the access signal from the arithmetic circuit. The value $t_1$ held in the table address $T_1$ is set in the register 146, at a block 1008. If the starter switch 112 is OFF and therefore the answer at the block 1004 is NO, then the discriminator signal indicative of the engine coolant temperature condition corresponding to the coolant temperature signal value, the engine speed signal value and the load signal value are read in, at a block 1010.

At a block 1012, the engine speed and the engine load are checked to see whether the engine speed signal value is equal to or greater than the given speed threshold and whether the engine load signal value is equal to or greater than the given load threshold $Q_{ref}$. If the answer is NO, then the engine coolant temperature is checked to see whether the discriminator signal indicative of the engine coolant temperature is HIGH-level and thus if the engine coolant temperature signal value is equal to or greater than the given temperature threshold $t_{ref}$. If the answer at the block 1014 is NO, the register 146 is set to zero (0).

If the answer at the block 1014 is YES, then the table address $T_2$ is accessed at a block 1018 and thus the stored value $t_2$ is read out. The value $t_2$ is set in the register 146. On the other hand, if the answer of the block 1012 is YES, the engine coolant temperature is checked to see whether it is higher than the given temperature threshold $t_{ref}$ by checking for the presence of a HIGH-level discriminator signal indicative of the engine coolant temperature parameter, at a block 1022. If the answer at the block 1022 is NO, then the table address $T_3$ is accessed to read out the value $t_3$ at a block 1024. The read value $t_3$ is fed to the register 146 to be set therein, at a block 1026.

If the answer at the block 1022 is YES, the table address $T_4$ is looked up to read out the stored value $t_4$, at a block 1028. Then, the value $t_4$ is set in the register 146 at a block 1030. After any of the blocks 1008, 1016, 1020, 1026 or 1030, the arithmetic circuit operation ends.

As set forth previously, on the basis of the value in the register 146, the duration of the control signal is determined and thus a control signal with a determined duration is produced by one of the control signal generators 106-1 to 106-4 in the output circuit 106.

Figure 8:
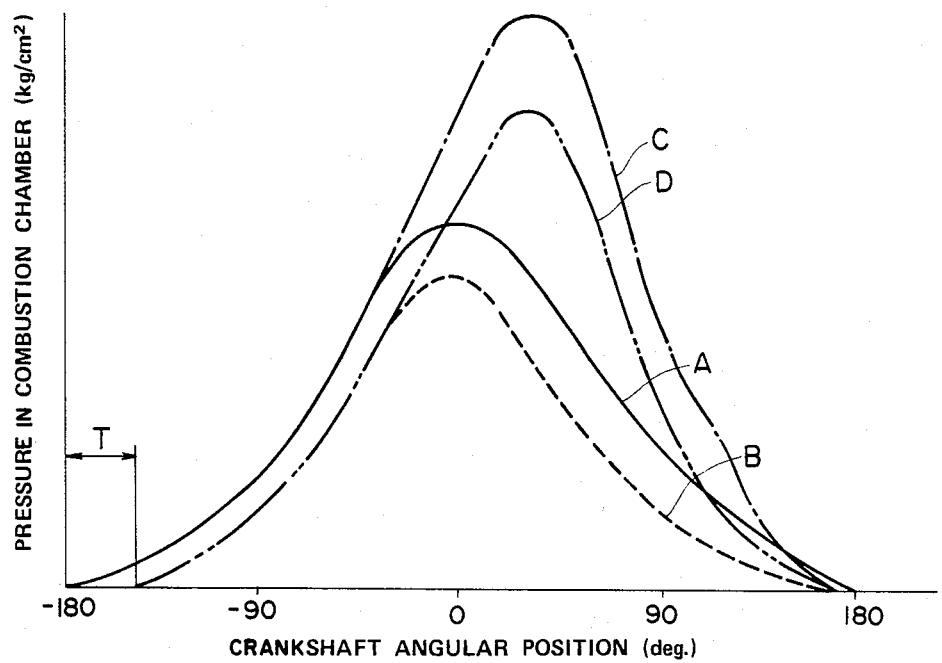
FIG. 8 is a graph of the variation of the pressure in the combustion chamber in terms of the engine revolution.

According to the shown embodiment, the compression ratio is adjusted depending on the engine operating condition as illustrated in FIG. 8. In FIG. 8, line A represents the variation of the pressure in the combustion engine as full compression is performed and thus the compression control valve is not opened at all, during engine cranking. The line B shows the variation of the pressure in the combustion engine during engine cranking when the compression ratio is controlled to 80% of the full compression ratio. The line C shows the variation of the compression while the engine is running after cranking when full compession is achieved and thus the compression control valve is not opened. The line D shows the variation of the compression while the engine is running with the compression ratio controlled to 80% of the full ratio.

As will be appreciated herefrom, by controlling the compression ratio during engine cranking, the engine starting characteristics are improved to shorten the cranking period and reduce the engine load during cranking. This causes a reduction in the load on the vehicle battery during cranking. In addition, by reducing the compression pressure in the combustion chamber when the engine is in a state otherwise proven to cause engine knocking, harmfully intense knocking in the engine is prevented.

Furthermore, according to the present invention, when the compression ratio in the combustion chamber at relatively low engine speed and relatively low engine loads is maintained at full compression ratio, the engine output performance remains at its highest level to improve acceleration characteristics and thus improve fuel economy.

While the present invention has been described in terms of the specific embodiment for describing detailed construction and function to embody the present invention, it should not be taken as limitative to the invention. It should be appreciated that the present invention can be embodied in any way without departing from the principle of the invention and the shown embodiment can be modified with any equivalent elements substituted for the shown elements. For example, the engine operational condition can be detected in other ways, such as by detecting a throttle valve angular position, intake vacuum pressure, or required torque, representative of the engine load condition.

Figure 9:
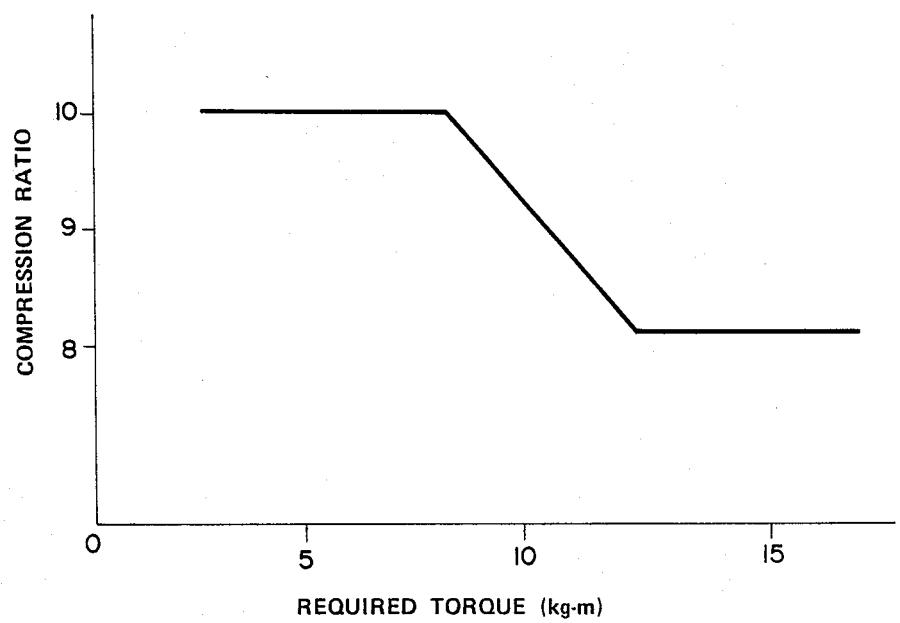
FIG. 9 shows the variation of the compression ratio in relation to the load condition on the engine at a constant engine speed.

FIG. 9 shows the relationship of the compression ratio and the required engine output torque at a constant engine speed. As will be appreciated, in case the engine load condition is detected in terms of the required engine output torque, the compression ratio may be controlled according to the shown characteristics of FIG. 9.

What is claimed is:

1. In an internal combustion engine having an engine cylinder block defining therein a plurality of engine cylinders and a cylinder head mounted on said cylinder block and defining therein an intake port and an exhaust port for introducing an air/fuel mixture into a combustion chamber defined in each engine cylinder, and exhausting an exhaust gas created in said combustion chamber, a method for controlling the compression ratio of said combustion chamber comprising the steps of:

defining a feedback circuit for feeding some of the air/fuel mixture in said combustion chamber back to an induction system of the engine;

providing a compression control valve in said feedback circuit;

detecting engine operating parameters including engine speed, engine load, engine coolant temperature, and starter switch position;

determining thresholds including an engine speed threshold, an engine load threshold, and engine coolant temperature threshold;

determining an open period of said compression control valve depending on said engine operating parameters;

detecting an engine operational position in terms of the engine stroke cycle by detecting a crankshaft rotational position in relation to the engine stroke cycle; and determining a timing at which to open said compression control valve based on said detected engine operational position so that said compression control valve is operated in synchronism with the engine revolution in such a manner that:

said valve is open for a first duration when said engine speed and said engine load are respectively higher than an engine speed threshold and an engine load threshold, and said engine coolant temperature is lower than an engine coolant temperature threshold;

said valve is open for a second duration when said engine speed, said engine load and said engine coolant temperature are respectively higher than said engine speed threshold, said engine load threshold and said engine coolant temperature threshold;

said valve open period is determined at third duration when said engine speed and said engine load are not both higher than said engine speed threshold and said engine load threshold and said engine coolant temperature is higher than said engine coolant temperature threshold;

said valve is open for a fourth duration when said engine speed and said engine load both higher than said engine speed threshold and said engine load threshold and said engine temperature is lower than said engine temperature threshold; and said valve is open for a fifth duration when said starter switch is ON.

2. The method as set forth in claim 1, wherein said fourth duration is zero, whereby said compression control valve remains closed.

3. A compression control system for an internal combustion engine which includes an engine cylinder block defining therein a plurality of engine cylinders and a cylinder head mounted on said cylinder block and defining therein an intake port for introducing an air/fuel mixture through an induction system and an exhaust port for exhausting an exhaust gas created in a combustion chamber defined by the engine cylinder and the cylinder block comprising:

sensor means including an engine speed sensor for detecting the revolution speed of the engine and producing an engine speed signal, an engine load sensor for detecting the load on the engine and producing an engine load signal, an engine coolant temperature sensor for detecting the engine coolant temperature and producing a temperature signal, a crank angle sensor for producing a crank reference angle signal, and a crank position signal indicative of a given angle of rotation of a crankshaft of the engine;

a mixture recirculating circuit defined in said cylinder head for feeding some of the air/fuel mixture in said combustion chamber back to said induction system;

valve means incorporated in said mixture recirculating circuit for controlably establishing and blocking communication between said combustion chamber and said mixture recirculating circuit;

a valve actuator for operating said valve means in order to control the amount of said air/fuel mixture to be fed back to said induction system, said valve actuator being responsive to a control signal to be energized to open said valve means to establish said communication for a period defined by the duration of said control signal; and a controller associated with said valve actuator for outputting thereto said control signal, said controller being responsive to said engine speed signal, said engine load signal, said temperature signal, and said starter signal, as well as to said crank reference angle signal and said crank position signal, and including a memory for storing a plurality of predetermined duration values of said controlled signal in the form of a look-up table which is read out in terms of said engine speed, engine load, and said engine temperature parameters for determining the control signal duration, and where it said controller further includes means for producing reference values respectively representative of given engine speed thresholds, a given engine load threshold, and a given engine coolant temperature threshold to be compared respectively to the engine speed signal value, engine load signal value, and said engine coolant temperature signal value, said controller assigning the duration of said control signal the appropriate one of the values described as follows:

a first value when said engine speed signal value and said engine load signal value are respectively greater than said engine speed threshold and said engine load threshold and said engine coolant temperature signal value is less than said engine coolant temperature threshold;

a second value when said engine speed signal value, said engine load signal value and said engine coolant temperature signal value are respectively greater than said engine speed threshold, said engine load threshold and said engine coolant temperature threshold;

a third value when said engine speed signal value and said engine load signal value are not both greater than said engine speed threshold and said engine load threshold and said engine coolant temperature signal value is greater than said engine coolant temperature threshold; and a fourth value when said engine speed signal value, and said engine load signal value are not both greater than said engine speed threshold and said engine load threshold and said engine coolant temperature signal value is less than said engine coolant temperature threshold.

4. The system as set forth in claim 3, wherein said fourth value is zero to maintain said valve actuator in deenergized position.

5. The system as set forth in claim 4, wherein said controller is further responsive to said starter signal to assign the duration of said control signal a fifth value.

6. In an internal combustion engine having an engine cylinder block defining therein a plurality of engine cylinders and a cylinder head mounted on said cylinder block and defining therein an intake port and an exhaust port for introducing an air/fuel mixture into a combustion chamber defined in each engine cylinder, and exhausting an exhaust gas created in said combustion chamber, a method for controlling the compression ratio in said combustion chamber comprising the steps of:

defining a feedback circuit for feeding some of the air/fuel mixture in said combustion chamber back to an induction system of the engine;

providing a compression control valve in said feedback circuit;

detecting an engine operating parameter;

comparing the detected engine operating parameter with a predetermined threshold value to determine an open period of said compression control valve depending on said engine operating parameter;

detecting engine operational position in terms of the engine stroke cycle; and determining a timing at which to open said compression control valve based on said detected engine operational position so that said compression control valve is operated in synchronism with the engine revolution, said opening period being determined in such a manner that:

said valve is open for a first duration when said engine speed and said engine load are respectively higher than an engine speed threshold and an engine load threshold, and said engine coolant temperature is lower than an engine coolant temperature threshold;

said valve is open for a second duration when said engine speed, said engine load and said engine coolant temperature are respectively higher than said engine speed threshold, said engine load threshold and said engine coolant temperature threshold;

said valve is open for a third duration when said engine speed and said engine load are not both respectively higher than said engine speed threshold and said engine load threshold and said engine coolant temperature is higher than said engine coolant temperature threshold;

said valve is open for a fourth duration when said engine speed and said engine load are both respectively higher than said engine speed threshold and said engine load threshold and said engine temperature is lower than said engine temperature threshold; and said valve is open for a fifth duration when said starter switch is ON.

7. The method as set forth in claim 6, wherein said engine operating parameter is detected by detecting engine speed, engine load and engine coolant temperature.

8. The method as set forth in claim 7, wherein said engine operating parameter is further detected by detecting a starter switch position to detect the engine cranking state.

9. The method as set forth in claim 8, wherein said engine operational position is detected by detecting a crankshaft rotational position in relation to the engine stroke cycle.

10. A compression control system for an internal combustion engine which includes an engine cylinder block defining therein a plurality of engine cylinders and a cylinder head mounted on said cylinder block and defining therein an intake port for introducing an air/fuel mixture through an induction system and an exhaust port for exhausting an exhaust gas created in a combustion chamber defined by the engine cylinder and the cylinder block, comprising:

sensor means associated with said engine for detecting an engine operating condition and producing an engine operating condition-indicative signal representative of an engine operational parameter;

a mixture recirculating circuit defined in said cylinder head for feeding some of the air/fuel mixture in said combustion chamber back to said induction system;

valve means incorporated in said mixture recirculating circuit for controllably establishing and blocking communication between said combustion chamber and said mixture recirculating circuit;

a valve actuator for operating said valve means in order to control the amount of said air/fuel mixture to be fed back to said induction system, said valve actuator being responsive to a control signal to be energized to open said valve means to establish said communication for a period defined by the duration of said control signal; and a controller associated with said valve actuator for outputting thereto said control signal, said controller being operable to compare said engine operating condition-indicative signal value with a predetermined threshold value to derive the duration of said control signal depending upon the difference between the engine operating condition-indicative signal value and said threshold value and producing said control signal having said duration.

11. The system as set forth in claim 10, wherein said sensor means comprises an engine speed sensor for detecting the revolution speed of the engine and producing an engine speed signal, an engine load sensor for detecting the load on the engine and producing an engine load signal, and an engine coolant temperature sensor for detecting the engine coolant temperature and producing a temperature signal, and wherein said controller is responsive to said sensor signals for determining the duration of said control signal in accordance with said sensor signal values.

12. The system as set forth in claim 11, wherein said sensor means further comprises a crank angle sensor for producing a crank reference angle signal and a crank position signal indicative of a given angle of rotation of a crankshaft of the engine, said controller is responsive to said crank reference angle signal to determine a distribution timing of said control signal to a plurality of said valve actuators, each associated with one of a plurality of said valve means in a corresponding engine cylinder, and said controller is responsive to said crank position signal to determine the terminating timing of said control signal.

13. The system as set forth in claim 12, wherein said sensor means further comprises a starter switch for producing a starter signal indicative of an engine cranking state, and said controller is responsive to said starter signal for producing said control signal with a predetermined duration.

14. The system as set forth in claim 13, wherein said controller includes a memory for storing a plurality of predetermined duration values of said control signal in the form of a look-up table which is read out in terms of said engine speed, engine load and said engine temperature signals for determining the control signal duration in accordance with the engine operating condition.

15. A compression control system for an internal combustion engine comprising:
   an engine cylinder defining a combustion chamber therein;
   an induction system for introducing an air/fuel mixture into said combustion chamber;
   a return passage defined in said engine cylinder and connecting said combustion chamber to said induction system for conducting some of the air/fuel mixture in said combustion chamber back to said induction system;
   a compression control valve provided in said return passage and movable between a first position in which communication between said combustion chamber and said induction passage via said return passage is blocked and a second position in which said communication is established;
   a sensor for detecting at least one preselected engine operation parameter for producing a sensor signal indicative thereof; and
   a controller for controlling the operation of said compression control valve depending on an engine operating condition as represented by said sensor signal, said controller producing a control signal to actuate said compression control valve from said first position to said second position for a duration corresponding to the duration of said control signal, and said controller being operable to compare said sensor signal value with a predetermined threshold value to derive a first shorter duration of said control signal when said sensor signal value is equal to or less than said threshold value and a second longer duration of said control signal when said sensor signal value is greater than said threshold value.

16. The system as set forth in claim 15, wherein said compression control valve comprises a valve member having a valve head facing a valve seat formed at one end of said return passage, a bias spring for biasing said valve member to normally hold said valve member in said first position, and a valve actuator responsive to said control signal to hold said valve member in said second position for the duration of said control signal.

17. The system as set forth in claim 16, wherein said return passage comprises an annular passage defined around a valve stem of said valve member and an opening connecting said annular passage to said induction system.

18. The system as set forth in claim 15, wherein said sensor comprises an engine speed sensor, an engine load sensor, and an engine coolant temperature sensor respectively producing an engine speed signal indicative of the engine revolution speed, an engine load signal indicative of the load on the engine, a coolant temperature signal indicative of the engine coolant temprature, and a crank angle sensor producing a crank reference signal as well as a crank position signal indicative of a given angle of rotation of a crankshaft of the engine.

19. The system as set forth in claim 18, wherein said controller includes a memory for storing values defining selectable durations of said control signal in the form of a look-up table having a plurality of addresses, one of which is accessed according to the engine operating condition determined on the basis of said sensor signals.

20. The system as set forth in claim 19, wherein said controller further controls distribution of said control signal to each engine cylinder so that said compression control valve is operated to open during the compression stroke of the engine revolution cycle for each cylinder.

21. The system as set forth in claim 19, which further comprises a starter switch outputting a starter signal indicative of the engine cranking condition, and said controller is responsive to said starter signal to produce said control signal with a predetermined duration for the engine cranking state to open said compression control valve for the period defined by said control signal duration.

* * * * *